Inventor
William E. White.

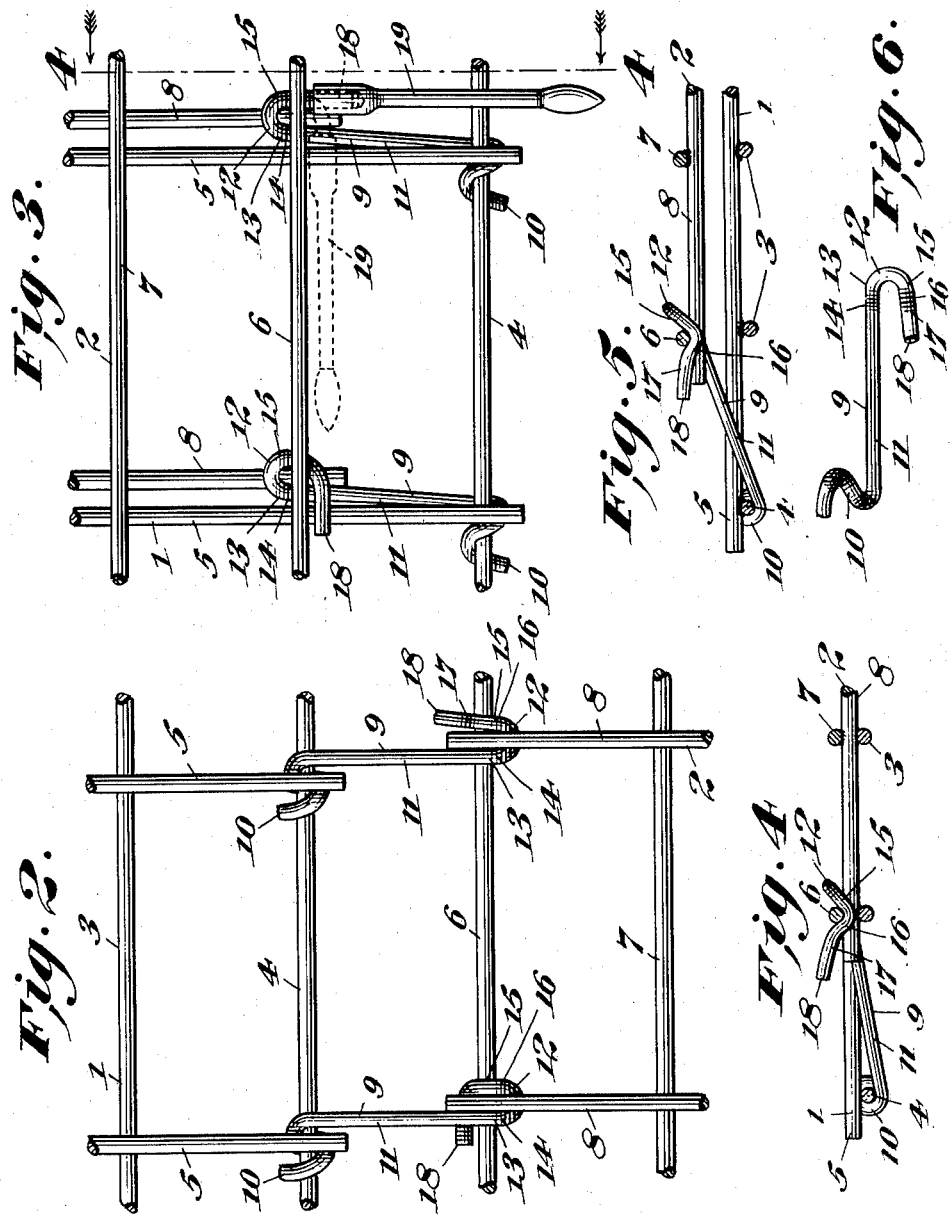

United States Patent Office 2,787,198
Patented Apr. 2, 1957

2,787,198

HINGED WELDED FABRIC

William E. White, Bethlehem, Pa., assignor to Bethlehem Steel Company, a corporation of Pennsylvania Application December 15, 1950, Serial No. 200,980

2 Claims. (Cl. 94—8)

This invention has to do with welded fabric and its use as reinforcement of concrete pavements. Current trends in highway design are toward lane widths of eleven to fourteen feet with requirements of reinforcement in flat sheets of corresponding widths, and lengths suitable to minimize number of laps and conform to prevailing standards of practice in highway construction.

Welded fabric is readily produced in sheets of such required widths and lengths. Transport and field handling of such sheets present problems of ever increasing difficulty, and it is imperative that means be found to fold these sheets for efficient shipment by rail or truck without impairment of their essential flatness and economy of labor cost in final installation. Division of these sheets into two leaves of suitably narrowed width and joining of them by effective hinging elements permitting ready folding and unfolding is a basic requirement of the problem and is the end to which my invention is directed.

I am aware that this basic requirement has been met with respect to so called clipped bar mats made up of deformed type reinforcing bars manually assembled in sheets dimensionally similar to welded fabric sheets. Hinge elements of helical type can be formed integrally from the bars themselves and brought to effective engagement in the mat structure coincidentally with manual mat assembly.

Welded fabric is manufactured by automatic electric welding machines, which maintain accurate spacing between the longitudinal and transverse elements while rigidly welding them together at their intersections. This method of manufacture does not readily permit the use of integrally formed helically engaged hinge elements. I have found it feasible and functionally effective to incorporate a helical hinging element in a member separate from, rather than integral with, the fabric rods, and to combine in the hinging member suitable means for its ready attachment to the second leaf of the folding sheet.

One object of my present invention, therefore is to provide a hinged mat comprised of welded fabric units.

Another object is to provide a welded fabric mat composed of flat rigid units and hinge members which can be made with conventional welding and forming machinery and readily assembled.

Another object is a fabric mat with rigidly connected cross-members, which fabric can be conveniently shipped in assembled form and be quickly and easily put into place at the roadway site.

Other and further objects, purposes and advantages of my invention will appear hereinafter in the specification and drawings, and in the appended claims.

In the annexed two sheets of drawings:

Fig. 2 is a detail plan view of a portion of the fabric of Fig. 1, showing both locked and unlocked hinge members;

Fig. 3 is a detail plan view of a portion of the fabric in folded position, showing in solid and dotted lines the method of applying a hinge-locking tool;

Fig. 4 is a transverse vertical section taken on the line 4—4 of Fig. 3;

Fig. 5 is a transverse vertical section similar to Fig. 4, but with the fabric sections shown spaced sufficiently apart to permit the hinge members to be attached readily; and Fig. 6 is a plan view of a single hinge member.

Figure 1:
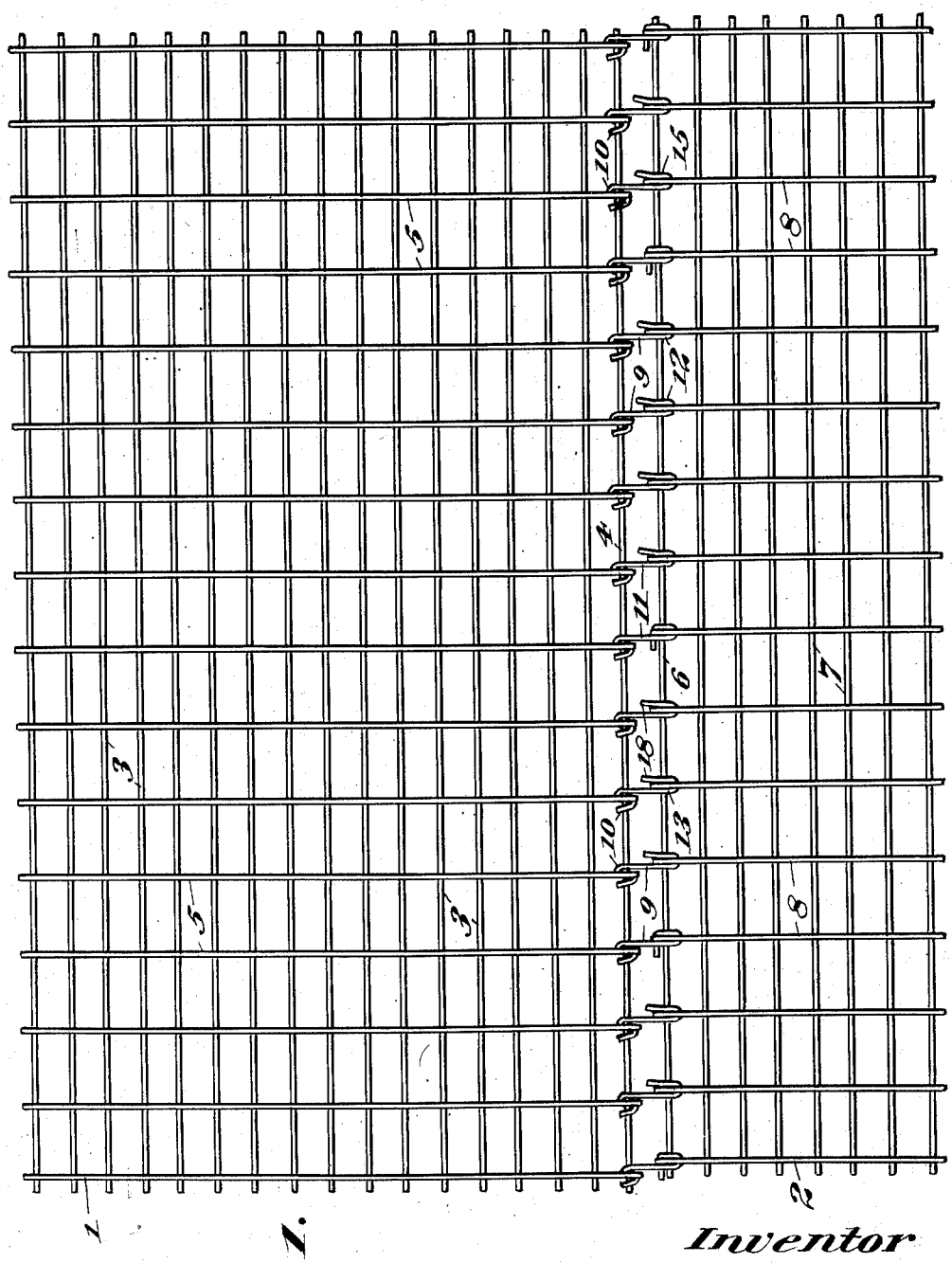
Fig. 1 is a plan view of my improved fabric mat in open position.

Referring now more in detail to the drawings, the numerals 1 and 2 designate the individual reticular leaves or sections of my improved road reinforcing fabric, the leaf 1 being comprised of the longitudinal rods or wires 3 and 4 and the transverse rods 5, and the leaf 2 being comprised of the longitudinal rods 6 and 7 and the transverse rods 8, the rods of each leaf being arranged at right angles, with the longitudinal rods being more closely spaced than the transverse rods, and welded together at their intersections. For purposes of even distribution of weight and proper nesting when piled folded, it is normally convenient to have one leaf approximately one-half the width of its companion leaf, which may very easily be done by setting the fabricating machine for the larger width and then cutting lengthwise as well as crosswise after the continuous length of welded material emerges from the machine. In order to effect proper welding in the fabricating machine, the transverse rods 5 and 8 must extend slightly or overhang about an inch beyond the longitudinal rods 4 and 6 along the adjacent sides of the companion leaves. The side longitudinal rod 4 serves as the pivotal axis for the hinge members 9, which hinge members engage with and are maintained in properly spaced relation by the extended ends of the transverse rods 5 and 8.

Each of said hinge members 9, as shown in Fig. 6, has an offset upward spiral pig tail end portion 10, a straight shank portion 11, and a U-shaped hook end portion 12, the inner leg 13 of said hook being bent upwardly about 30° at 14 and the outer leg 15 of said hook descending parallel thereto and then being bent sharply upward approximately 90° at 16, with the angle of bend being somewhat reduced at 17 and terminating in a tail extension 18. With suitable dies, the hinge members may be very rapidly and easily formed by conventional machine operations.

To assemble the complete article, the wide fabric leaf 1 is preferably placed horizontally in a suitable jig (not shown), and the spiral end portion 10 of each hinge member 9 is attached by a simple twisting motion to the pivot rod 4 as shown in Fig. 5, with the shank portion 11 of the hinge member 9 being propped up by the jig in the position shown. The narrow fabric leaf 2 is then held above and substantially parallel to the leaf 1, and manipulated so that the U-shaped hook end portions 12 of the hinge members 9 straddle the transverse rods 8 and engage at 14 and 16 beneath the side longitudinal rod 6. The tail extensions 18 of some (or all if desired) of the hinge members 9 are then bent manually over their respective transverse rods 8, and parallel to the longitudinal rod 6 as shown in Fig. 3, by means of the locking tool 19 or other similar device.

Under the prevailing practice, paving reinforcement is usually installed by the so-called "strike-off" method, in which the concrete is deposited in two separate layers, the first layer being roughly struck off by a template at the proper elevation to serve as a supporting bed for the reinforcement. With my improved fabric, it is obviously simple and convenient for two men to place the folded fabric flat on the pre-struck layer of concrete, with the hinged narrow leaf preferably uppermost, lift and throw the upper leaf over into position, and then pour the final layer of concrete thereover. Since the top concrete layer is only about two inches thick, the advantage in having a dependably flat fabric is apparent.

By the use of the separate hinge members 9, I am able to use strong and rigid welded leaves in compactly foldable road reinforcement, with the hinge members in effect providing an additional uniform separation space between longitudinal rods of the panels, with the transverse rods properly aligned, and without any appreciable increase in weight over non-folding fabric of equal width. Simply by using heavier stock I can, if necessary, make the hinge members actually stronger than the fabric itself.

Although I have thus described my invention hereinabove in considerable detail, I do not wish to be limited narrowly to the exact and specific particulars disclosed, but I may also use such substitutes, modifications or equivalents as are included within the scope and spirit of the invention or pointed out in the appended claims.

I claim:

1. A hinged fabric structure comprising a pair of reticular units each comprised of a series of longitudinal and transverse rods welded together at their intersections, a plurality of hinge members each comprising an elongated substantially straight shank portion terminating at one end in a helix turned at right angles thereto and terminating at the other end in a U-shaped hook portion, the helical end of each such member being attached to a side longitudinal rod of one unit, and the hook portion of said member straddling a transverse rod of the other unit and engaging beneath the side longitudinal rod of said other unit.

2. A hinged fabric structure comprising a pair of reticular units each comprised of a series of longitudinal and transverse rods welded together at their intersections, and a plurality of hinging link members each comprising an elongated substantially straight shank portion terminating at one end in a helix and provided at the other end with a hook portion and an extended tail portion, said hook and tail portions being formed on a plane at approximately a right angle to the helix, a side longitudinal rod on one unit constituting the pivotal axis onto which the helix of each link member is attached, the hook portion of each member being bent upwardly and straddling a transverse rod of the second unit, and certain of the extended tail portions being bent sidewise under certain of the transverse rods of said second unit.

References Cited in the file of this patent
UNITED STATES PATENTS

| | | |
|---|---|---|
| 1,772,654 | White | Aug. 12, 1930 |
| 1,791,692 | Swenson | Feb. 10, 1931 |
| 2,313,211 | Aldrich | Mar. 9, 1943 |
| 2,360,674 | Harter | Oct. 17, 1944 |
| 2,361,164 | Arthur | Oct. 24, 1944 |
| 2,405,556 | Bogle | Aug. 13, 1946 |
| 2,417,578 | White | Mar. 18, 1947 |